US006882834B1

(12) United States Patent
Balboni (10) Patent No.: US 6,882,834 B1
(45) Date of Patent: Apr. 19, 2005

(54) DIRECT CONVERSION RECEIVER APPARATUS

(75) Inventor: Edmund J. Balboni, Littleton, MA (US)

(73) Assignee: Analog Devices, Inc., Norwood, MA (US)

( * ) Notice: Subject to any disclaimer, the term of this patent is extended or adjusted under 35 U.S.C. 154(b) by 433 days.

(21) Appl. No.: 10/133,084

(22) Filed: Apr. 26, 2002

(51) Int. Cl.$^7$ .............................. H04B 1/06; H04B 7/00
(52) U.S. Cl. ........................ 455/255; 455/76; 455/209; 455/314
(58) Field of Search ............................. 455/76, 84, 86, 455/87, 131, 189.1, 207, 209, 226.1, 311, 313, 314, 304, 323, 324, 236.1; 329/304, 306, 323, 324, 346; 331/12

(56) References Cited

U.S. PATENT DOCUMENTS

| | | | |
|---|---|---|---|
| 4,485,383 A | | 11/1984 | Maher |
| 4,736,390 A | | 4/1988 | Ward et al. |
| 5,163,160 A | * | 11/1992 | Foucher et al. ............... 455/76 |
| 5,303,417 A | * | 4/1994 | Laws ........................ 455/314 |
| 5,761,615 A | * | 6/1998 | Jaffee ....................... 455/314 |
| 6,125,272 A | | 9/2000 | Bautista et al. |
| 6,175,726 B1 | * | 1/2001 | Sydon ........................ 455/209 |
| 6,192,225 B1 | | 2/2001 | Arpaia et al. |
| 6,445,726 B1 | * | 9/2002 | Gharpurey ................. 455/314 |
| 6,516,184 B1 | * | 2/2003 | Damgaard et al. ........... 455/86 |
| 2001/0041546 A1 | * | 11/2001 | Kazakevich ................. 455/313 |
| 2002/0102951 A1 | * | 8/2002 | Nakano et al. ............. 455/118 |

FOREIGN PATENT DOCUMENTS

GB 2 166 311 4/1986

OTHER PUBLICATIONS

"Spread Spectrum Systems," Robert C. Dixon. *Wiley–Interscience Publication*. 1984.
"GPS Receiver RF Subsystem Design Overview," Hammell et al. 1988. RF Expo. *Collins Government Avionics Division, Rockwell International Corporation.* p. 23–35.
"A High IIP2 Downconversion Mixer Using Dynamic Matching," Bautista et al. *IEEE Journal of Solid–State Circuits.* Dec., 2000. vol. 35, No. 12.

* cited by examiner

*Primary Examiner*—Lester G. Kincaid
*Assistant Examiner*—Sam Bhattacharya
(74) *Attorney, Agent, or Firm*—Gauthier & Connors LLP (57) ABSTRACT

A direct conversion receiver apparatus includes a local oscillator to produce a first local oscillation signal and a second oscillation signal. A first modulation circuit modulates the first local oscillation signal, and a second modulation circuit modulates the second local oscillation signal. A RF mixer mixes a received radio frequency signal with the modulated first local oscillation signal, and another RF mixer mixes the received radio frequency signal with the modulated second local oscillation signal. Demodulating circuits translate desired signals of the mixed signal from the RF mixers into band and translate undesired signals of the mixed signal out of band. Filters remove the undesired signals from the demodulated signals.

58 Claims, 8 Drawing Sheets

DIRECT CONVERSION RECEIVER APPARATUS

FIELD OF THE PRESENT INVENTION

The present invention is directed to a direct conversion receiver employing a modulated local oscillator (LO) signal. More specifically, the present invention is directed to a direct conversion receiver that separates a received radio signal into its in-phase (I) and quadrature (Q) components while also reducing second-order intermodulation products due to non-linearities in the mixers while simultaneously maintaining high spurious response rejection.

BACKGROUND OF THE PRESENT INVENTION

A superheterodyne receiver is currently the most common type of receiver used in modern communications devices. Such receivers can be found in virtually any home, office, or automobile within a television set, telephone, or radio. A superheterodyne receiver mixes (or multiplies) an incoming radio-frequency (RF) signal (carrier at frequency $f_1$) with a sinusoid signal (at a frequency $f_2$) generated by a local oscillator. The resulting output signal comprises two frequency-shifted versions of the incoming signal centered at the sum and difference of the combining frequencies ($f_1+f_2$ and $f_1-f_2$).

Typically, the highest frequency components (centered at $f_1+f_2$) are filtered out using a bandpass filter and the output signal only contains the intermediate-frequency (IF) components (centered at $f_1-f_2$). This process may be repeated several times in high-performance superheterodyne receivers.

While superheterodyne receivers are widely used, superheterodyne receivers use expensive and non-integrable RF and IF components such as bandpass filters. As a result, superheterodyne receivers are not ideal for applications in small, low cost mobile communication systems such as cellular phones, pagers, cordless phones, and the like.

Alternative receivers, such as a direct conversion receiver, are well known in the art and potentially offer significant advantages over the superheterodyne receiver.

Figure 1:
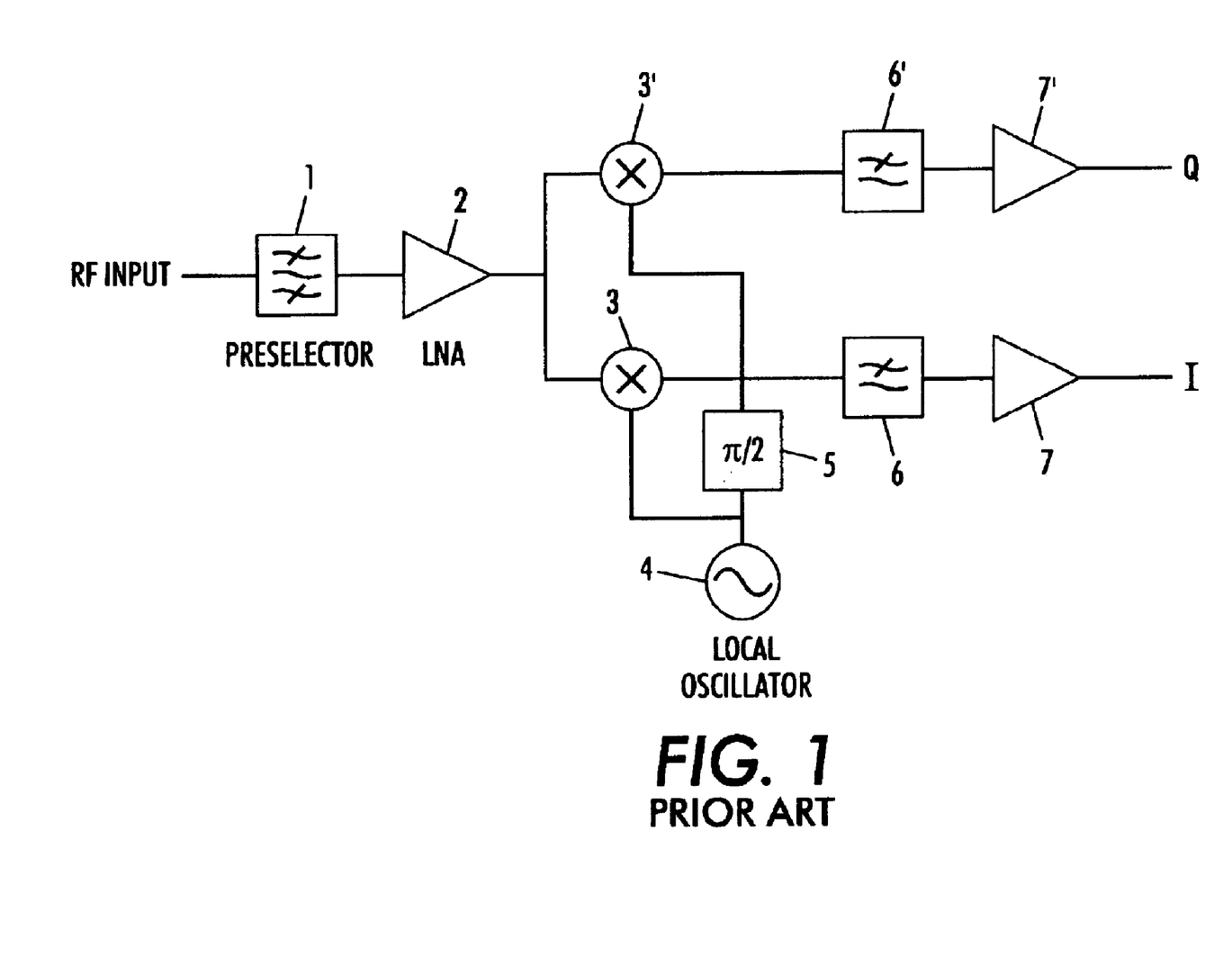
FIG. 1 is a block diagram showing a prior art direct conversion receiver.

A traditional direct conversion receiver, as shown in FIG. 1, directly converts an incoming signal into its baseband in-phase and quadrature components without any intermediate translation into an IF signal. The operation of this traditional direct conversion receiver is simple.

An incoming bandpass signal $g(t)$ (which can be mathematically represented by $g(t)=g_i(t)\cos(2f_1t)-g_q(t)\sin(2f_1t)$ is received at the RF input and then passed through a preselector filter 1 and a low-noise amplifier (LNA) 2. The preselector filter 1 is simply a bandpass filter designed to pass the desired signal $g(t)$ and to reject spurious out-of-band signals. In most applications, the bandwidth of the preselector filter 1 is much greater than the bandwidth of the desired signal. Furthermore, the preselector filter 1 may pass unwanted signals in addition to the desired signal.

After passing through the preselector filter 1, the signal $g(t)$ is split and sent through the two mixers 3, 3'. In the upper mixer 3', the signal $g(t)$ is mixed with a sinusoid tuned to the same frequency as the carrier frequency (e.g., $\cos(2 f_1t)$). In the lower mixer 3, the signal $g(t)$ is mixed with the same sinusoid as in the upper mixer 3', but with a phase change of /2 (e.g., $\sin(2 f_1t)$). The mixers 3, 3' produce the in-phase ($g_i(t)$) and quadrature ($g_q(t)$) components of the desired signal ($g(t)$) centered at baseband and at twice the carrier frequency ($2f_c$). The high frequency components are eliminated by the low pass filters 6, 6', and the in-phase and quadrature signals are finally amplified by the amplifiers 7,7'. There are several advantages of a direct conversion receiver over the more popular superheterodyne receiver.

First, the direct conversion receiver directly converts the incoming signal into its baseband signal directly and eliminates the step of initially translating the RF signal into an IF signal. Thus, all of the intermediate filters, mixers, and amplifiers can be omitted and the circuit is simplified.

Secondly, exception of the preselector filter, the direct conversion receiver employs only low pass filters rather than bandpass filters. Normally, it is easier to integrate a low pass filter onto a single chip than a band pass filter. Thus, the direct conversion receiver may be largely constructed on a single integrated circuit, which makes it smaller and less expensive than a superheterodyne receiver.

While there are advantages to direct conversion receivers over superheterodyne receivers, the traditional direct conversion receiver suffers from some disadvantages.

One problem with traditional direct conversion receivers is second-order distortion present in the mixer. Second-order distortion is caused by the fact that a mixer is inherently a non-linear device. When an off-channel RF signal is detected along with the desired signal, the non-linearity in the mixers produce the second harmonic of the undesired signal at baseband plus a DC offset. Since the direct conversion receiver also shifts the desired signal to baseband, this second-order distortion produced by the mixer can significantly reduce the performance of the receiver.

Moreover, the mixer can operate like a "square law" detector and convert the envelope of a strong interferer to baseband. If the envelope of the interferer is constant in time, then a DC offset appears at baseband. In this case, there are several methods known in the art to suppress this unwanted DC offset.

For example, the DC offset may be attenuated by high pass filtering the baseband output of the mixers. While this method is effective to eliminate a DC offset, it is ineffective for distortion due to a non-constant envelope of an interferer. Thus, a need exists for a direct conversion receiver that is capable of attenuating distortion caused by either a constant or a non-constant envelope of an interferer.

Another problem with direct conversion receivers is spurious emissions. The main source of spurious emissions in a direct conversion receiver is local oscillator leakage. In an ordinary superheterodyne receiver, the local oscillator leakage to the antenna is attenuated by the first receiver bandpass filter. In a direct conversion receiver, however, the local oscillator frequency lies within the pass band of the preselector filter. Thus, local oscillator leakage is not suppressed in the traditional direct conversion receiver. Other problems associated with direct conversion receivers are baseband offsets, low frequency noise, and drift.

One approach to address the problems related to those discussed above is set forth in an article entitled "GPS Receiver RF Subsystem Design Overview," by Hammell et al. The "GPS Receiver RF Subsystem Design Overview" article discloses a receiver which uses a direct-sequence PN "T"-code to modulate the local oscillator. This results in simultaneously frequency conversion and modulation of the input signal to an intermediate frequency. The modulated IF signal is then amplified and bandpass filtered then despread using the same "T"-code to separate the desired signal from the local oscillation leakage signal. This configuration provides a receiver capable of rejecting unwanted LO leakage from the RF to IF in a heterodyne receiver.

Although the configuration of the "GPS Receiver RF Subsystem Design Overview" article reduces out-of-band interference, the disclosed receiver fails to substantially lower DC offsets while maintaining high spurious response rejection.

Another approach to address the problems discussed above is set forth in U.S. Pat. No. 6,192,225 to Arpaia et al. U.S. Pat. No. 6,192,225 discloses a direct conversion receiver which uses a local oscillator to produce a local reference signal at the frequency of the modulation of the input signal. The local oscillation signal is modified by switchable phase elements, and the modified local oscillation signals are then fed to an I-channel mixer and a Q-channel mixer. The oscillation signals going to the two mixers are out of phase with each other due to the modification by the phase change elements. The mixed signals are fed to switchable inverters and low pass filters.

Although the direct conversion receiver of U.S. Pat. No. 6,192,225 reduces spurious emissions, the disclosed direct conversion receiver fails to substantially lower DC offsets or reduce sensitivity to amplitude modulation (AM) while maintaining high spurious response rejection.

A further approach to address the problems discussed above is set forth in U.S. Pat. No. 6,125,272 to Bautista et al. U.S. Pat. No. 6,125,275 discloses a differential RF mixer circuit that employs dynamic matching. The mixer circuit utilizes a switching network that includes cyclically changing transistor pairs to create an imbalance in the circuit that can be modulated. The modulation can be used to eliminate the IM2 distortion element from the desired signal.

Although the differential RF mixer circuit of U.S. Pat. No. 6,125,272 reduces the IM2 distortion element from the desired signal, the disclosed differential RF mixer circuit fails to substantially lower DC offsets or reduce sensitivity to amplitude modulation (AM) while maintaining high spurious response rejection.

A third approach is the use of "chopping" or "dynamic matching". "Chopping" or "dynamic matching" at two or more ports of a mixer can potentially mitigate sources of baseband offsets, low frequency noise, and drift associated with a direct conversion receiver. One example of a conventional "chopping" or "dynamic matching" approach is illustrated in FIG. 2.

Figure 2:
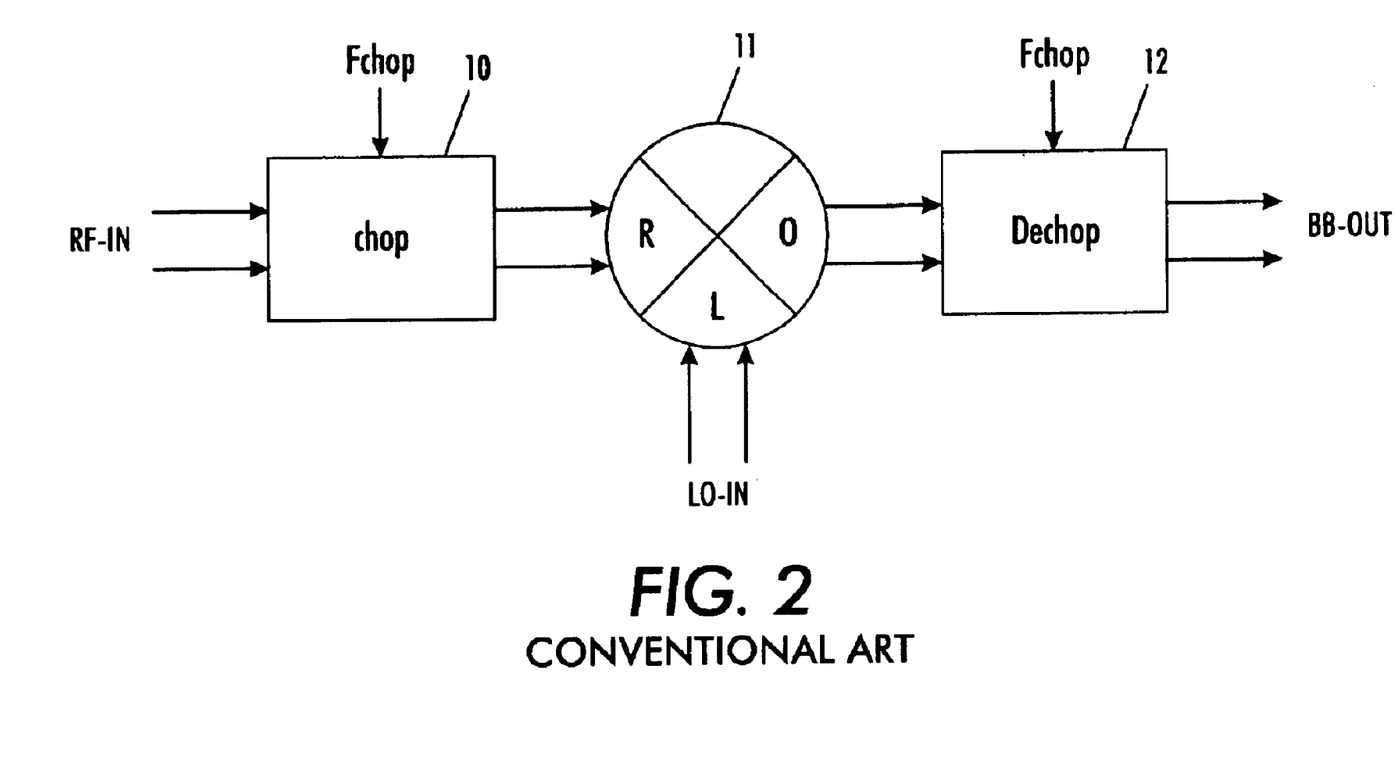
FIG. 2 is a block diagram showing a conventional "chopping" approach for a direct conversion receiver.

In the "chopped" or "dynamic matched" mixer of FIG. 2, the "chop" 10 and "dechop" 12 blocks multiply the analog waveform by +/−1 under control of the logic level with a frequency of $F_{chop}$. In this conventional example, a radio frequency signal, RF-In, is fed to the "chop" block 10 where to signal is modulated with a frequency of $F_{chop}$. The modulated signal is then mixed with a local oscillation signal, LO-In, at mixer 11. The mixed signal is de-modulated by "dechop" block 12 with a frequency of $F_{chop}$.

The "chopped" or "dynamic matched" mixer of FIG. 2 is easily implemented in a CMOS or BiCMOS process since good, low distortion switches are capable of implementing a +/−1 multiplication with good result in a fully-differential implementation.

The primarily penalty associated with "chopping" or "dynamic matching" is susceptibility to spurious responses at $F_{LO}+/-n*F_{CHOP}$. In an ideal implementation, these responses are all zero. However, a real circuit is nonlinear during the transitions, which are finite in duration, and thus the responses are not all non-zero, and result in spurious responses.

Furthermore, in a direct conversion receiver, the local oscillator produces a DC output due to self-mixing in the RF port. The offset changes due to the dynamic loading of the antenna by the environment as well as changes in temperature, supply voltage, and/or channel number (local oscillator frequency). Most of the change is at very low frequencies and can be removed easily using a feedback loop.

However, only slow changes in the DC can be removed by the feedback loop, not higher speed changes in the DC offset since these higher speed changes fall outside the bandwidth of the tracking loop.

In the situation where global systems for mobile communication technology is being utilized, the gain from the antenna to the mixer is typically 10 db. The required sensitivity for the receiver is typically −106 dBm (1.1 microvolts-rms). The rms signal voltage at the mixer is 3.5 microvolts. In order not to cause reduced sensitivity, the DC offset due to the mixer needs to be about 1.1 microvolts or less. However measurements show that typically, the offset when referenced to the mixer input is 1 to 2 $mV_{rms}$. Ideally, 60 dB of DC offset suppression is needed.

Moreover, a regenerative divider can be used to synthesize the local oscillator and/or an even-harmonic mixer can be used so that the common direct conversion receiver effects of local oscillator pulling and AM rectification can be minimized. However, radiation and dynamic re-reflection of the local oscillator signal at the antenna is still a significant problem.

Therefore, it is desirable to provide a direct conversion receiver that avoids the various problems outlined above. Moreover, it is desirable to provide a direct conversion receiver that spreads an intermediate frequency (IF) across a wide bandwidth and despreads the IF using the same modulated signal to lower DC offsets and to reduce sensitivity to amplitude modulation (AM), while maintaining high spurious response rejection.

SUMMARY OF THE INVENTION

A first aspect of the present invention is a frequency translation apparatus. The frequency translation apparatus includes a local oscillator to produce a local oscillation signal; a modulation circuit to modulate the local oscillation signal; a first RF mixer to mix a received radio frequency signal with the modulated local oscillation signal; and a demodulating circuit, receiving a modulation signal and the mixed signal from the first RF mixer, to translate desired signals of the mixed signal into band and to translate undesired signals of the mixed signal out of band.

A second aspect of the present invention is a frequency translation apparatus. The frequency translation apparatus includes a local oscillator to produce a local oscillation signal; a first modulation circuit to modulate the local oscillation signal; a second modulation circuit to modulate a received RF signal; a first RF mixer to mix the modulated radio frequency signal with the modulated local oscillation signal; and a demodulation circuit, receiving a first modulation signal and the mixed signal from the first RF mixer, to translate desired signals of the mixed signal into band and to translate undesired signals of the mixed signal out of band.

A third aspect of the present invention is a frequency translation apparatus. The frequency translation apparatus includes a local oscillator to produce a local oscillation signal; a modulation circuit to modulate the local oscillation signal; a first RF mixer to mix a received radio frequency signal with the modulated local oscillation signal; a variable gain amplifier to amplify the mixed signal from the first RF mixer; and a demodulation circuit, receiving a modulation signal and the amplified signal from the variable gain amplifier, to translate desired signals of the amplified signal into band and to translate undesired signals of the amplified signal out of band.

A fourth aspect of the present invention is a frequency translation apparatus. The frequency translation apparatus includes a local oscillator to produce a local oscillation signal; a first modulation circuit to modulate the local oscillation signal; a first RF mixer to mix a received radio frequency signal with the modulated local oscillation signal; a demodulation circuit, receiving a first modulation signal and the mixed signal from the first RF mixer, to translate a first set of signals of the mixed signal into band and to translate a second set of signals of the mixed signal out of band; a lowpass filter to suppress spurious responses; a second modulation circuit to modulate the filtered signal from the lowpass filter; a variable gain amplifier to amplify the modulated-filtered signal; and a second demodulation signal said variable gain amplifier, to translate a third set of signals of the mixed signal into band and to translate a fourth set of signals of the mixed signal out of band.

Another aspect of the present invention is a direct conversion receiver apparatus. The direct conversion receiver apparatus includes a local oscillator to produce a first local oscillation signal and a second oscillation signal; a first modulation circuit to modulate the first local oscillation signal; a second modulation circuit to modulate the second local oscillation signal; a first RF mixer to mix a received radio frequency signal with the modulated first local oscillation signal; a second RF mixer to mix the received radio frequency signal with the modulated second local oscillation signal; a first demodulating circuit, receiving a modulation signal and the mixed signal from the first RF mixer, to translate desired signals of the mixed signal from the first RF mixer into band and to translate undesired signals of the mixed signal from the first RF mixer out of band; a second demodulating circuit, receiving a modulation signal and the mixed signal from the second RF mixer, to translate desired signals of the mixed signal from the second RF mixer into band and to translate undesired signals of the mixed signal from the second RF mixer out of band; a first filter, operatively connected to the first demodulating circuit, to remove the undesired signals from the demodulated signal from the first demodulating circuit; and a second filter, operatively connected to the second demodulating circuit, to remove the undesired signals from the demodulated signal from the second demodulating circuit.

A further aspect of the present invention is a method for frequency translation in a direct conversion receiver. The method produces a local oscillation signal; modulates the local oscillation signal; mixes a received radio frequency signal with the modulated local oscillation signal; and demodulates the mixed signal to translate desired signals of the mixed signal into baseband and to translate undesired signals of the mixed signal out of baseband.

Another aspect of the present invention is a method for frequency translation in a direct conversion receiver. The method produces a local oscillation signal; modulates the local oscillation signal; modulates a received RF signal; mixes the modulated radio frequency signal with the modulated local oscillation signal; and demodulates the mixed signal to translate desired signals of the mixed signal into band and to translate undesired signals of the mixed signal out of band.

Another aspect of the present invention is a method for frequency translation in a direct conversion receiver. The method produces a local oscillation signal; modulates the local oscillation signal; mixes a received radio frequency signal with the chopped local oscillation signal; demodulates the mixed signal to translate a first set of signals of the mixed signal into baseband and to translate a second set of signals of the mixed signal out of baseband; filters spurious responses; modulates the filtered signal; amplifies the modulated filtered signal; and demodulates the amplified signal to translate a third set of signals of the mixed signal into baseband and to translate a fourth set of signals of the mixed signal out of baseband.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE INVENTION

Figure 3:
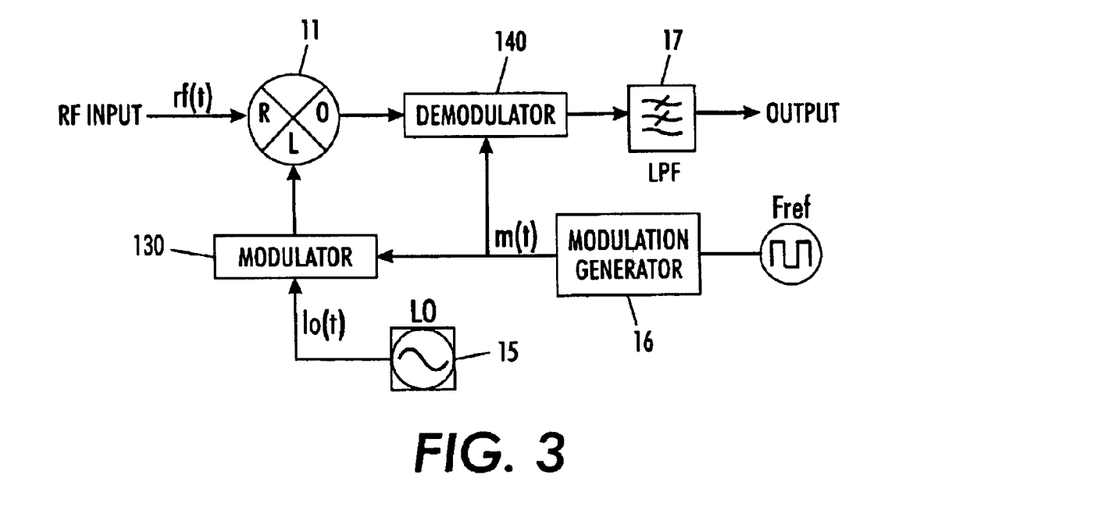
FIG. 3 is a block diagram showing an implementation of the frequency translator for a direct conversion receiver of FIG. 3 according to the concepts of the present invention.

FIG. 3 illustrates a frequency translator wherein a local oscillator 15 produces a local oscillation signal, lo(t). A modulation circuit 130 modulates the local oscillation signal lo(t) with a signal m(t) from modulation generator 16 that generates signal m(t) in response to a received frequency. A RF mixer 11 mixes a received radio frequency signal rf(t) with the modulated local oscillation signal from modulation circuit 130. The mixed signal is fed to a demodulation circuit 140 that translates the desired signal of the mixed signal into band and translates undesired signal of the mixed signal out of band by demodulating the mixed signal with the signal m(t). The translated signal is then passed through a lowpass filter 17 to remove the undesired signals of the mixed signal.

Figure 4:
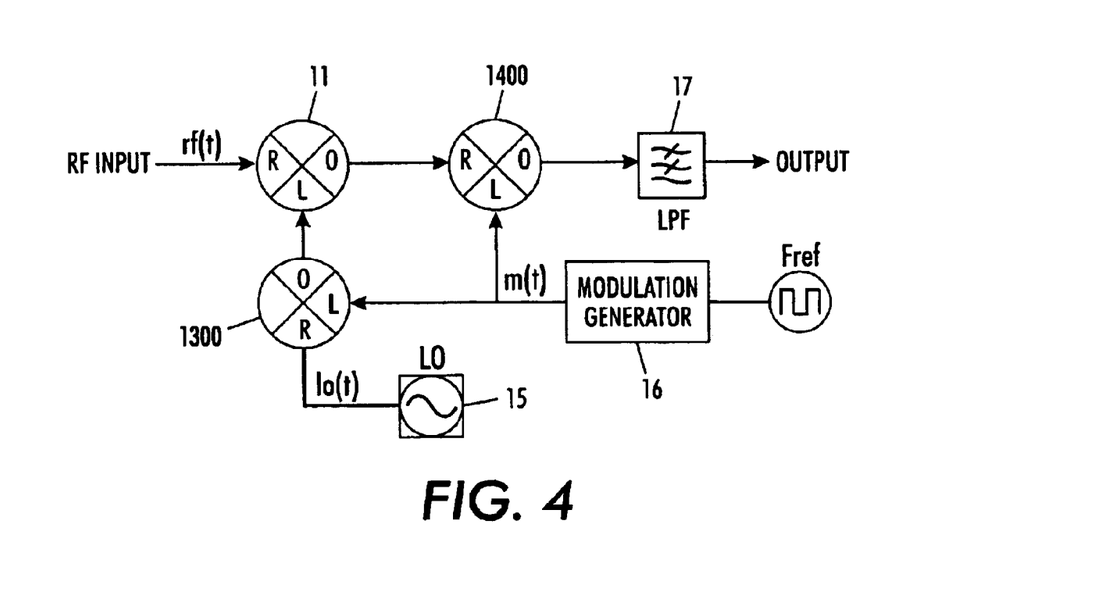
FIG. 4 is a block diagram showing another implementation of the frequency translator for a direct conversion receiver of FIG. 3 according to the concepts of the present invention.

In a further implementation, as illustrated in FIG. 4, a local oscillator 15 produces a local oscillation signal lo(t). A RF mixer circuit 1300 receives the local oscillation signal lo(t) at its radio frequency port and mixes it with a signal m(t) from modulation generator 16 that mixer circuit 1300 receives at its local oscillator port. Modulation generator 16 generates signal m(t) in response to a received frequency. Another RF mixer 11 mixes a received radio frequency signal rf(t) with the modulated local oscillation signal from RF mixer 1300. The mixed signal is fed to a third RF mixer 1400 that translates the desired signal of the mixed signal into band and translates undesired signal of the mixed signal out of band by mixing the mixed signal with the signal m(t). The translated signal is then passed through a lowpass filter 17 to remove the undesired signals of the mixed signal.

In the embodiments illustrated in FIGS. 3 and 4, the modulation signals, m(t) or $F_{chop}$, can be square wave signals, single period square wave signals, signals consisting of multiple periods generated as the product of two or more periodic square waves, pseudorandom binary sequence square waves, or sigma-delta modulator noise shaped sequence square waves. Moreover, the modulation signals, m(t) or $F_{chop}$, may have frequency spectrum located adjacent to the desired signal.

The embodiments of FIGS. 3 and 4 provide an advantage over the prior art in that the modulation is impressed onto the LO rather than the RF input. The local oscillator contains a single strong signal and intermodulation distortion IMD is less of an issue the modulating the RF input. Also the small loss though the chopping switches can be compensated by slightly higher local oscillator drives.

Figure 5:
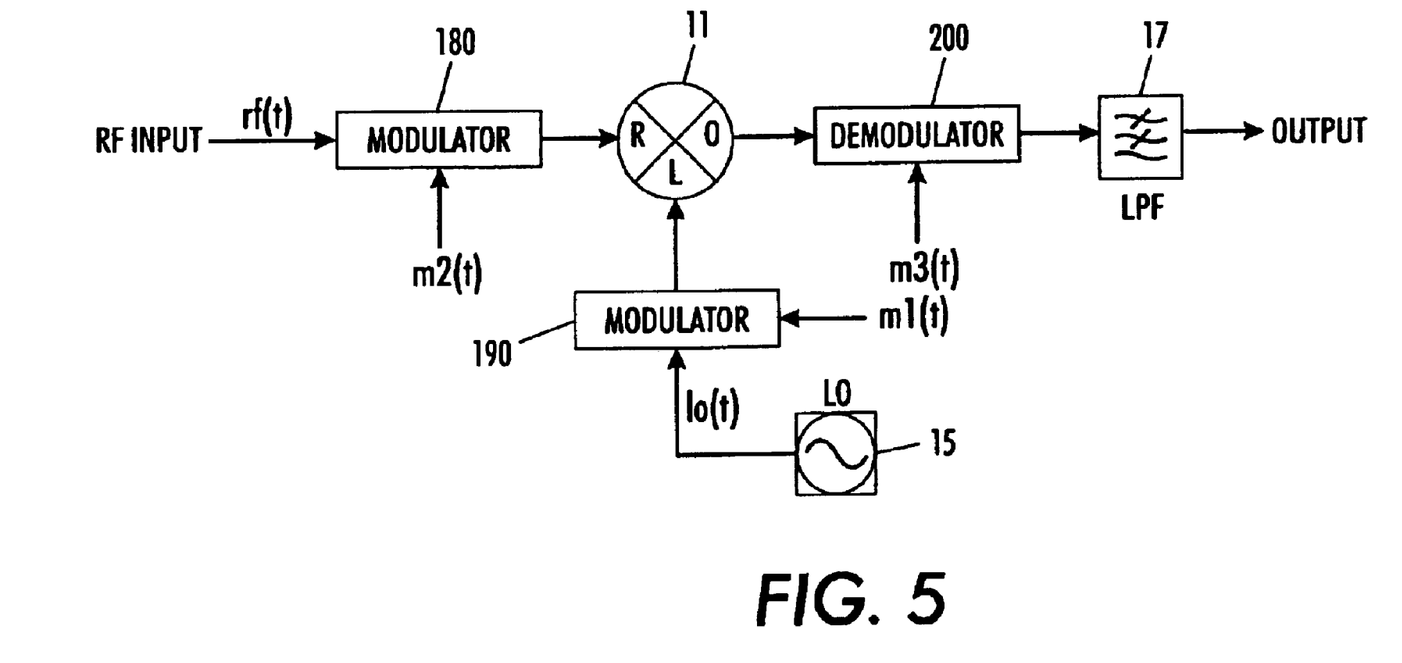
FIG. 5 is a block diagram showing an implementation of the frequency translator for a direct conversion receiver of FIG. 6 according to the concepts of the present invention.

FIG. 5 illustrates a frequency translator wherein a local oscillator 15 produces a local oscillation signal, lo(t). A modulation circuit 190 modulates the local oscillation signal lo(t) with a signal m1(t). Another modulation circuit 180 modulates a received radio frequency signal rf(t) with a signal m2(t). A RF mixer 11 mixes the modulated radio frequency signal from modulation circuit 180 with the modulated local oscillation signal from modulation circuit 190. The mixed signal is fed to a demodulation circuit 200 that translates the desired signal of the mixed signal into band and translates undesired signal of the mixed signal out of band by demodulating the mixed signal with the signal m3(t). The translated signal is then passed through a lowpass filter 17 to remove the undesired signals of the mixed signal.

In the embodiment illustrated in FIG. 5, the modulation signals, m(1–3)(t) or, can be square wave signals, single period square wave signals, signals consisting of multiple periods generated as the product of two or more periodic square waves, pseudorandom binary sequence square waves, or sigma-delta modulator noise shaped sequence square waves. Moreover, the modulation signals, m(1–3)(t), may have frequency spectrum located adjacent to the desired signal. Furthermore, each of the modulation circuits may be a RF mixer.

Figure 6:
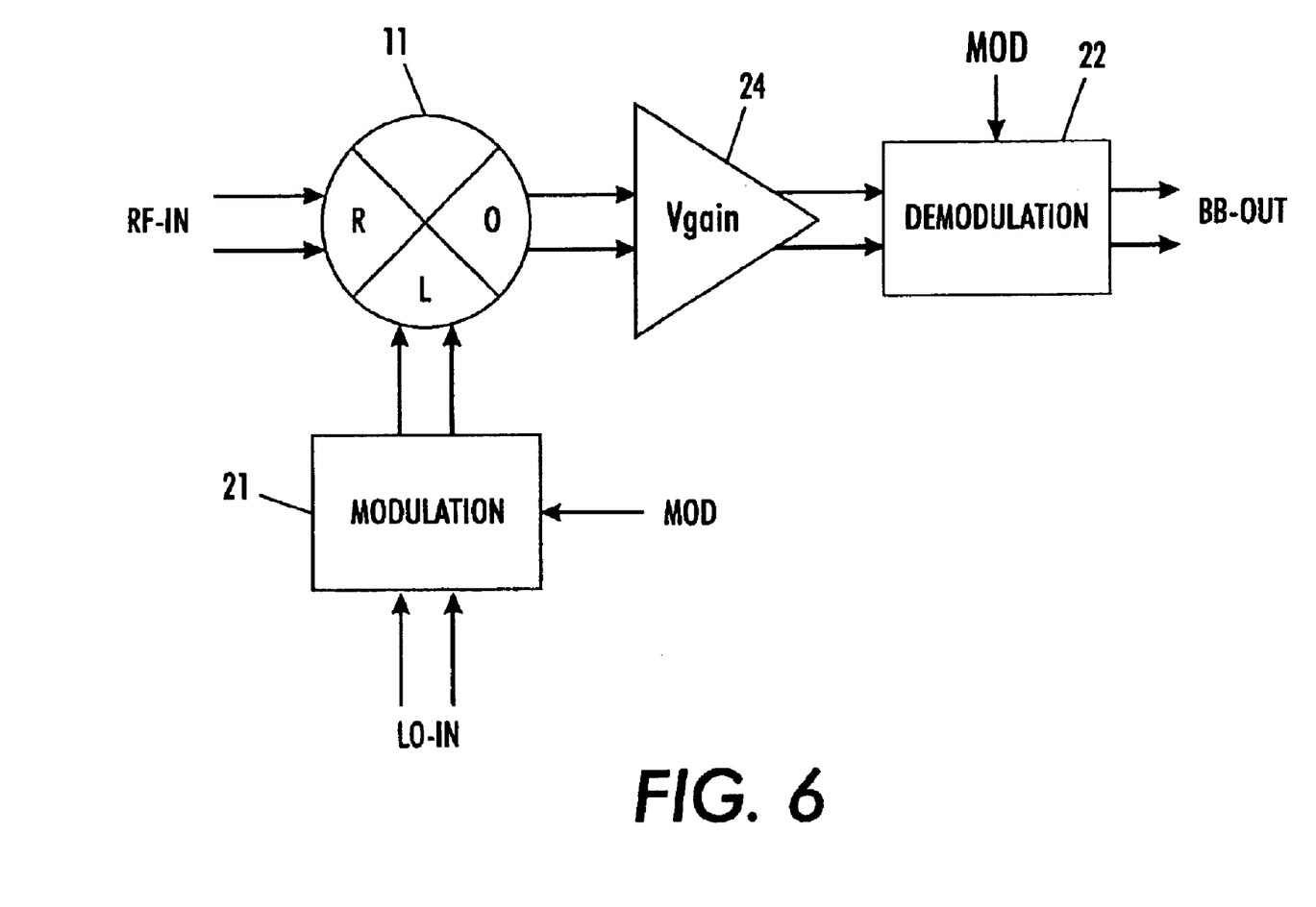
FIG. 6 is a block diagram showing another embodiment of a frequency translator for a direct conversion receiver according to the concepts of the present invention.

In FIG. 6, a local oscillator (not shown) produces a local oscillation signal, LO-In. A modulation circuit 21 modulates the local oscillation signal LO-In, with a signal MOD. A RF mixer 11 mixes a received radio frequency signal RF-In with the modulated local oscillation signal from modulation circuit 21. The mixed signal is fed to a variable gain amplifier 24 to amplify the mixed signal. The amplified mixed signal is then fed to a demodulation circuit 22 that translates the desired signal of the amplified mixed signal into band and translates undesired signal of the amplified mixed signal out of band by demodulating the mixed signal with the signal MOD.

In the embodiment of FIG. 6, the modulation circuit may be a RF mixer. Moreover, the modulation signal MOD can be a square wave signal, a single period square wave signal, a signal consisting of multiple periods generated as the product of two or more periodic square waves, a pseudorandom binary sequence square wave, or a sigma-delta modulator noise shaped sequence square wave. The modulation signal MOD may have a frequency spectrum located adjacent to the desired signal.

Figure 7:
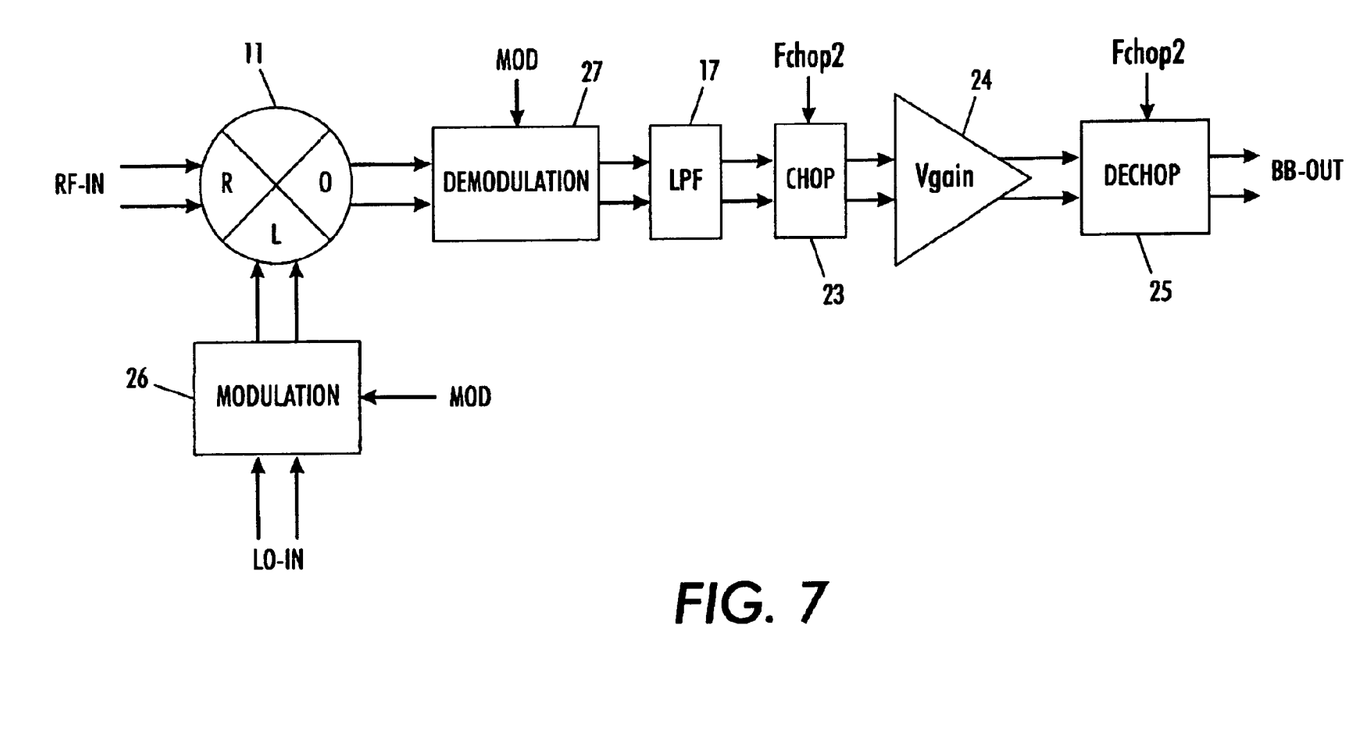
FIG. 7 is a block diagram showing another embodiment of a frequency translator for a direct conversion receiver according to the concepts of the present invention.

In FIG. 7, a local oscillator (not shown) produces a local oscillation signal, LO-In. A modulation circuit 26 modulates the local oscillation signal LO-In, with a signal MOD. A RF mixer 11 mixes a received radio frequency signal RF-In with the modulated local oscillation signal from modulation circuit 26. The mixed signal is then fed to a demodulation circuit 27 that translates the desired signal of the mixed signal into band and translates undesired signal of the mixed signal out of band by demodulating the mixed signal with the signal MOD. The translated signal is filtered by lowpass filter 17 that filters out the undesired signals of the mixed signal. The filtered signal is then fed into a chop circuit 23 that modulates the filtered signal with a signal $F_{chop-2}$. The chopped filtered signal is fed to a variable gain amplifier 24 to amplify the signal. The amplified signal is then fed to a dechop circuit 25 that demodulates the amplified signal with the signal $F_{chop-2}$.

In the embodiment of FIG. 7, the chop circuit 23 may be a modulation circuit or RF mixer, and the modulation circuit 26 may be a RF mixer. Moreover, the modulation signals, MOD and $F_{chop(-2)}$ can be square wave signals, single period square wave signals, signals consisting of multiple periods generated as the product of two or more periodic square waves, pseudorandom binary sequence square waves, or sigma-delta modulator noise shaped sequence square waves. The modulation signals, MOD and $F_{chop(-2)}$, may have frequency spectrum located adjacent to the desired signal.

Furthermore, in FIG. 7, the mixer is modulated at one frequency with the output lowpass filter placed after the demodulation to suppress spurious response while the amplifier is chopped at a second frequency. In this embodiment, the mixer modulation and the baseband amplifier chopping are decoupled and can be treated separately. Thus, the embodiment of FIG. 7 provides good performance in a high dynamic range narrowband cellular system such as global systems mobile communication (GSM) technologies.

Figure 8:
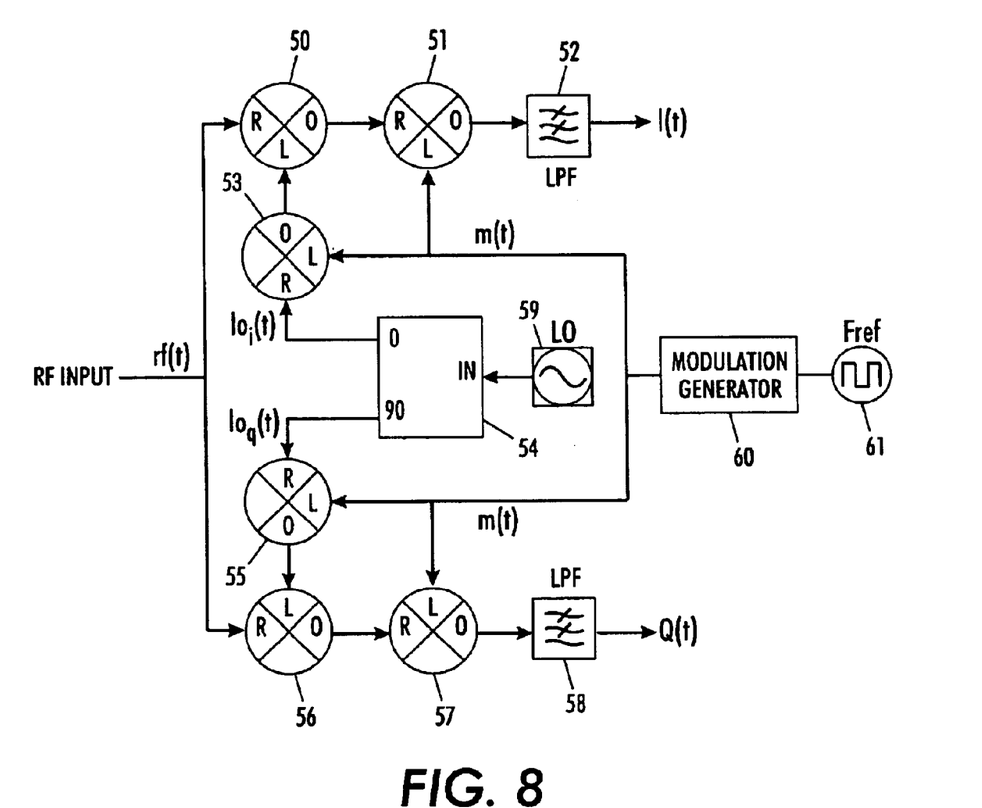
FIG. 8 is a block diagram showing another embodiment of a direct conversion receiver according to the concepts of the present invention.

FIG. 8 illustrates one embodiment of the present invention implemented in a direct conversion receiver. As illustrated in FIG. 8, a local oscillator 59 produces a local oscillator signal that is fed into a phase change circuit 54 that produces local oscillator signals $lo_i(t)$ and $lo_q(t)$.

As further illustrated in FIG. 8, for an I component of a received radio frequency signal, a RF mixer circuit 53 receives the local oscillation signal $lo_i(t)$ at its radio frequency port and mixes it with a signal m(t) from modulation generator 60 that mixer circuit 53 receives at its local oscillator port. Modulation generator 60 generates signal m(t) in response to a received frequency 61. Another RF mixer 50 mixes the received radio frequency signal rf(t) with the modulated local oscillation signal from RF mixer 53. The mixed signal is fed to a third RF mixer 51 that translates the desired signal of the mixed signal into band and translates undesired signal of the mixed signal out of band by mixing the mixed signal with the signal m(t). The translated signal is then passed through a lowpass filter 52 to remove the undesired signals of the mixed signal to produce signal I(t).

For an Q component of a received radio frequency signal, a RF mixer circuit 55 receives the local oscillation signal $lo_q(t)$ at its radio frequency port and mixes it with a signal m(t) from modulation generator 60 that mixer circuit 55 receives at its local oscillator port. Another RF mixer 56 mixes the received radio frequency signal rf(t) with the modulated local oscillation signal from RF mixer 55. The mixed signal is fed to a sixth RF mixer 57 that translates the desired signal of the mixed signal into band and translates undesired signal of the mixed signal out of band by mixing the mixed signal with the signal m(t). The translated signal is then passed through a lowpass filter 58 to remove the undesired signals of the mixed signal to produce signal Q(t).

In the embodiment of FIG. 8, the modulation signal m(t) can be a square wave signal, a single period square wave signal, a signal consisting of multiple periods generated as the product of two or more periodic square waves, a pseudorandom binary sequence square wave, or a sigma-delta modulator noise shaped sequence square wave. The modulation signal m(t) may have frequency spectrum located adjacent to the desired signal.

Figure 9:
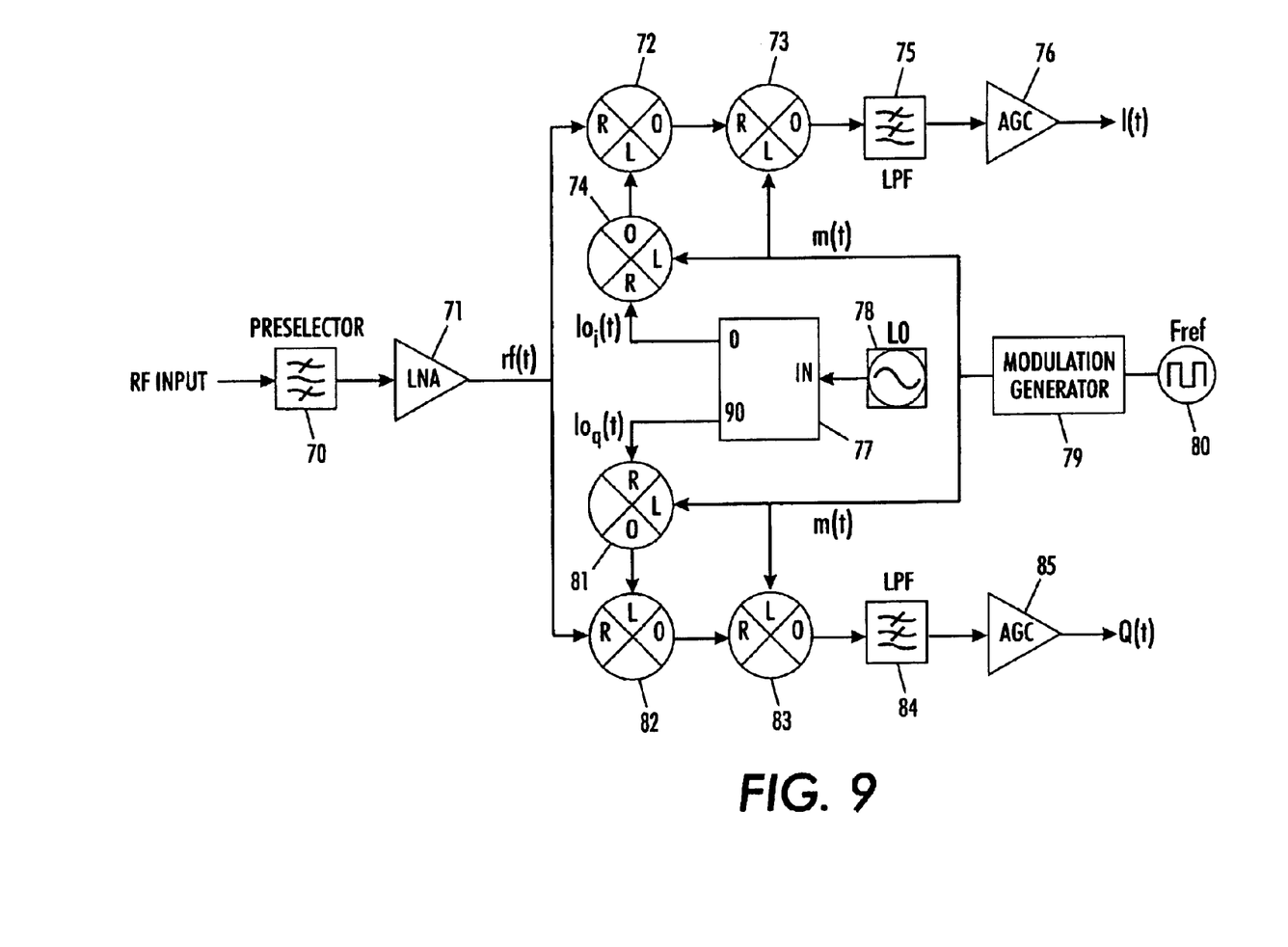
FIG. 9 is a block diagram showing another embodiment of a direct conversion receiver according to the concepts of the present invention.

FIG. 9 illustrates another embodiment of the present invention implemented in a direct conversion receiver. As illustrated in FIG. 9, a radio frequency signal is received by a preselector filter 70 and passed a low noise amplifier 71 to produce signal rf(t). A local oscillator 78 produces a local oscillator signal that is fed into a phase change circuit 77 that produces local oscillator signals $lo_i(t)$ and $lo_q(t)$.

As further illustrated in FIG. 9, for an I component of a received radio frequency signal, a RF mixer circuit 74 receives the local oscillation signal $lo_i(t)$ at its radio frequency port and mixes it with a signal m(t) from modulation generator 79 that mixer circuit 74 receives at its local oscillator port. Modulation generator 79 generates signal m(t) in response to a received frequency 80. Another RF mixer 72 mixes the received radio frequency signal rf(t) with the modulated local oscillation signal from RF mixer 74. The mixed signal is fed to a third RF mixer 73 that translates the desired signal of the mixed signal into band and translates undesired signal of the mixed signal out of band by mixing the mixed signal with the signal m(t). The translated signal is then passed through a lowpass filter 75 to remove the undesired signals of the mixed signal and an automatic gain control circuit 76 to produce signal I(t).

For an Q component of a received radio frequency signal, a RF mixer circuit 81 receives the local oscillation signal $lo_q(t)$ at its radio frequency port and mixes it with a signal m(t) from modulation generator 60 that mixer circuit 81 receives at its local oscillator port. Another RF mixer 82 mixes the received radio frequency signal rf(t) with the modulated local oscillation signal from RF mixer 81. The mixed signal is fed to a sixth RF mixer 83 that translates the desired signal of the mixed signal into band and translates undesired signal of the mixed signal out of band by mixing the mixed signal with the signal m(t). The translated signal is then passed through a lowpass filter 84 to remove the undesired signals of the mixed signal and an automatic gain control circuit 85 to produce signal Q(t).

As noted above, the present invention provides a mixer for a direct conversion receiver wherein the local oscillator signal is modulated and the baseband signal is demodulated. In the present invention, the modulated local oscillator signal creates a baseband response to the radio frequency (RF) signal input at offsets related to the modulation spectrum. The baseband signal is then demodulated restoring the signal. Reflected local oscillator signal, however, interacts in the mixer with the modulated local oscillator signal to produce a demodulated local oscillator signal at baseband.

The local oscillator signal is then remodulated resulting in a modulated local oscillator signal at baseband. The spectrum of the modulated local oscillator signal at baseband can be placed outside the bandwidth of the channel select filter and rejected. As stated before, the primarily penalty associated with wideband modulation is susceptibility to spurious responses at $F_{LO}+/-n*F_{MOD}$; i.e., undesired images which must be suppressed. Image suppression is related to the period of the modulation signal, the rise and fall time of the modulator, and the bandwidth of the mixer IF.

Best image suppression is attained by using a low modulation frequency coupled with very a fast modulator and a high bandwidth mixer. The high bandwidth mixer can be implemented by placing the demodulator before roofing filter capacitors(s).

Table 1 below shows various modulation frequencies with the resulting spurious suppression. As shown in the table, the best results are seen when modulating at a slow rate but with fast transition times. In addition, the dominant spurious offset, which is at twice the modulation frequency, is relaxed at lower offsets. For example, in GSM technologies, out of band blocking requirement is at 0 dBm dropping to −43 dBm for input offsets of between 1.6 MHz and 600 kHz.

TABLE 1

$T_{RISE} = T_{FALL} = 0.1$ ns, $BW_{IF} \sim 1$ GHz

| Modulation Freq [MHz] | Image Offset [MHz] | Suppression [dBc] |
| --- | --- | --- |
| 104 | 208 | 29 |
| 52 | 104 | 35 |
| 26 | 52 | 41 |
| 13 | 26 | 47 |
| 6.5 | 13 | 53 |
| 3.25 | 6.5 | 59 |
| 1.625 | 3.25 | 65 |
| 0.8125 | 1.625 | 71 |
| 0.65 | 1.3 | 72 |
| 0.40625 | 0.8125 | 75 |

The modulation approach of the present invention can dramatically reduce the effects of AM, 1/f noise, and dynamic DC offsets in a direct conversion receiver. Moreover, spurious response due to modulation is reduced by modulating at a low frequency with very fast transitions in the modulator and mixer located between the modulator circuit and the demodulator circuit. This requires a wideband mixer, and the demodulator circuit to be placed prior to any filtering in the baseband circuit. Furthermore, the embodiments of the present invention meet the requirements of a narrowband system such as GSM by modulating at 0.40625 MHz, which places the image at a 0.8125 MHz offset where the spurious response rejection is somewhat relaxed.

In a GSM system, a direct conversion receiver modulating at 406.25 kHz should provide sufficient spurious response rejection (~76 dB) and improved AM rejection (~30 dB) and reduced DC offset (×10).

In summary, the improvement, according to the concepts of the present invention, is threefold:

1. The mixer 1/f noise at the output of the mixer is modulated by a signal with zero DC content resulting in the 1/f noise being displaced out of the baseband where it can be removed by a lowpass filter;
2. Signals due to AM rectification fall at or near baseband at the mixer output and are similarly moved out and filtered off by the demodulator and lowpass filter; and
3. Dynamic DC offsets due to local oscillator signal leakage into the RF that is subsequently reflected back into the mixer are modulated twice and hence falls at baseband at the output of the mixer where it is remodulated and lowpass filtered.

In all cases, the demodulator after the mixer translates these unwanted products out of band where they are removed by the baseband filter and simultaneously translates the desired signal to baseband.

While various examples and embodiments of the present invention have been shown and described, it will be appreciated by those skilled in the art that the spirit and scope of the present invention are not limited to the specific description and drawings herein, but extend to various modification and changes all as set forth in the following claims.

What is claimed is:

1. A frequency translation apparatus, comprising:
    a local oscillator to produce a local oscillation signal;
    a modulation circuit to modulate the local oscillation signal;
    a first RF mixer to mix a received radio frequency signal with the modulated local oscillation signal; and
    a demodulating circuit, receiving a modulation signal and the mixed signal from said first RF mixer, to translate desired signals of the mixed signal into band and to translate undesired signals of the mixed signal out of bands;
    said modulating circuit being a second RF mixer;
    said second RF mixer receiving the local oscillation signal at an RF port;
    said second RF mixer receiving the modulation signal at a local oscillation port.

2. The frequency translation apparatus as claimed in claim 1, wherein said demodulating circuit is a third RF mixer;
    said third RF mixer receiving a mixed signal from said first RF mixer at an RF port and receiving the modulation signal at a local oscillation port.

3. The frequency translation apparatus as claimed in claim 1, wherein said second RF mixer receives the local oscillation signal at an RF port and receiving the modulation signal at a local oscillation port;
    said demodulating circuit being a third RF mixer;
    said third RF mixer receiving a mixed signal from said first RF mixer at an RF port and receiving the modulation signal at a local oscillation port.

4. The frequency translation apparatus as claimed in claim 1, wherein the modulation signal is a square wave signal.

5. The frequency translation apparatus as claimed in claim 1, further comprising:
    a filter to remove the undesired signals.

6. The frequency translation apparatus as claimed in claim 1, wherein the modulation signal has frequency spectrum located adjacent to the desired signal.

7. The frequency translation apparatus as claimed in claim 1, wherein the modulation signal is a single period square wave signal.

8. The frequency translation apparatus as claimed in claim 1, wherein the modulating signal consists of multiple periods generated as the product of two or more periodic square waves.

9. The frequency translation apparatus as claimed in claim 8, wherein the modulation signal is a pseudorandom binary sequence square wave.

10. The frequency translation apparatus as claimed in claim 1, wherein the modulation signal is a sigma-delta modulator noise shaped sequence square wave.

11. A frequency translation apparatus, comprising:
    a local oscillator to produce a local oscillation signal;
    a first modulation circuit to modulate the local oscillation signal;
    a second modulation circuit to modulate a received RF signal;
    a first RF mixer to mix the modulated radio frequency signal with the modulated local oscillation signal; and
    a demodulation circuit, receiving a first modulation signal and the mixed signal from said first RF mixer, to translate desired signals of the mixed signal into band and to translate undesired signals of the mixed signal out of band.

12. The frequency translation apparatus as claimed in claim 11, wherein the modulation signal is a square wave signal.

13. The frequency translation apparatus as claimed in claim 11, wherein the modulation signal has frequency spectrum located adjacent to the desired signal.

14. The frequency translation apparatus as claimed in claim 11, wherein the modulation signal is a single period square wave signal.

15. The frequency translation apparatus as claimed in claim 11, wherein the modulating signal consists of multiple periods generated as the product of two or more periodic square waves.

16. The frequency translation apparatus as claimed in claim 15, wherein the modulation signal is a pseudorandom binary sequence square wave.

17. The frequency translation apparatus as claimed in claim 11, wherein the modulation signal is a sigma-delta modulator noise shaped sequence square wave.

18. The frequency translation apparatus as claimed in claim 11, wherein said first modulating circuit is a second RF mixer;
    said second RF mixer receiving the local oscillation signal at an RF port and receiving a second modulation signal at a local oscillation port.

19. The frequency translation apparatus as claimed in claim 11, wherein said second modulating circuit is a second RF mixer;
    said second RF mixer receiving the RF signal at an RF port and receiving a second modulation signal at a local oscillation port.

20. The frequency translation apparatus as claimed in claim 11, wherein said demodulation circuit is a second RF mixer;
    said second RF mixer receiving a mixed signal from said first RF mixer at an RF port and receiving the first modulation signal at a local oscillation port.

21. The frequency translation apparatus as claimed in claim 11, wherein said first modulation circuit is a second RF mixer;
    said second RF mixer receiving the local oscillation signal at an RF port and receiving a second modulation signal at a local oscillation port;
    said second modulation circuit being a third RF mixer;
    said third RF mixer receiving the RF signal at an RF port and receiving a third modulation signal at a local oscillation port;
    said demodulation circuit being a fourth RF mixer;
    said fourth RF mixer receiving a mixed signal from said first RF mixer at an RF port and receiving the first modulation signal at a local oscillation port.

22. The frequency translation apparatus as claimed in claim 21, wherein said first modulation signal is a product of said second and third modulation signals.

23. The frequency translation apparatus as claimed in claim 11, further comprising:
a filter to remove the undesired signals.

24. A frequency translation apparatus, comprising:
a local oscillator to produce a local oscillation signal;
a modulation circuit to modulate the local oscillation signal;
a first RF mixer to mix a received radio frequency signal with the modulated local oscillation signal;
a variable gain amplifier to amplify the mixed signal from said first RF mixer; and
a demodulation circuit, receiving a modulation signal and the amplified signal from said variable gain amplifier, to translate desired signals of the amplified signal into band and to translate undesired signals of the amplified signal out of band.

25. The frequency translation apparatus as claimed in claim 24, wherein the modulation signal is a square wave signal.

26. The frequency translation apparatus as claimed in claim 24, further comprising:
a filter to remove the undesired signals.

27. The frequency translation apparatus as claimed in claim 24, wherein the modulation signal has frequency spectrum located adjacent to the desired signal.

28. The frequency translation apparatus as claimed in claim 24, wherein the modulation signal is a single period square wave signal.

29. The frequency translation apparatus as claimed in claim 24, wherein the modulating signal consists of multiple periods generated as the product of two or more periodic square waves.

30. The frequency translation apparatus as claimed in claim 29, wherein the modulation signal is a pseudorandom binary sequence square wave.

31. The frequency translation apparatus as claimed in claim 24, wherein the modulation signal is a sigma-delta modulator noise shaped sequence square wave.

32. The frequency translation apparatus as claimed in claim 24, wherein said modulation circuit is a second RF mixer;
said second RF mixer receiving the local oscillation signal at an RF port and receiving the modulation signal at a local oscillation port.

33. The frequency translation apparatus as claimed in claim 24, wherein said demodulation circuit is a second RF mixer;
said second RF mixer receiving the amplified signal from said variable gain amplifier at an RF port and receiving the modulation signal at a local oscillation port.

34. The frequency translation apparatus as claimed in claim 24, wherein said modulation circuit is a second RF mixer;
said second RF mixer receiving the local oscillation signal at an RF port and receiving the modulation signal at a local oscillation port;
said demodulation circuit being a third RF mixer;
said third RF mixer receiving the amplified signal from said variable gain amplifier at an RF port and receiving the modulation signal at a local oscillation port.

35. A frequency translation apparatus, comprising:
a local oscillator to produce a local oscillation signal;
a first modulation circuit to modulate the local oscillation signal;
a first RF mixer to mix a received radio frequency signal with the modulated local oscillation signal;
a first demodulation circuit, receiving a first modulation signal and the mixed signal from said first RF mixer, to translate a first set of signals of the mixed signal into band and to translate a second set of signals of the mixed signal out of band;
a lowpass filter to suppress spurious responses;
a second modulation circuit to modulate the filtered signal from said low pass filter;
a variable gain amplifier to amplified the modulated-filtered signal; and
a second demodulation circuit, receiving a second modulation signal and the amplified signal from said variable gain amplifier, to translate a third set of signals of the mixed signal into band and to translate a fourth set of signals of the mixed signal out of band.

36. The frequency translation apparatus as claimed in claim 35, wherein the modulation signal is a square wave signal.

37. The frequency translation apparatus as claimed in claim 35, further comprising:
a filter to remove the undesired signals.

38. The frequency translation apparatus as claimed in claim 35, wherein the modulation signal has frequency spectrum located adjacent to the desired signal.

39. The frequency translation apparatus as claimed in claim 35, wherein the modulation signal is a single period square wave signal.

40. The frequency translation apparatus as claimed in claim 35, wherein the modulating signal consists of multiple periods generated as the product of two or more periodic square waves.

41. The frequency translation apparatus as claimed in claim 40, wherein the modulation signal is a pseudorandom binary sequence square wave.

42. The frequency translation apparatus as claimed in claim 35, wherein the modulation signal is a sigma-delta modulator noise shaped sequence square wave.

43. The frequency translation apparatus as claimed in claim 35, wherein said first modulation circuit is a second RF mixer;
said second RF mixer receiving the local oscillation signal at an RF port and receiving the first modulation signal at a local oscillation port.

44. The frequency translation apparatus as claimed in claim 35, wherein said first demodulation circuit is a second RF mixer;
said second RF mixer receiving a mixed signal from said first RF mixer at an RF port and receiving the first modulation signal at a local oscillation port.

45. The frequency translation apparatus as claimed in claim 35, wherein said second modulation circuit is a second RF mixer;
said second RF mixer receiving the filtered signal from said low pass filter at an RF port and receiving the second modulation signal at a local oscillation port.

46. The frequency translation apparatus as claimed in claim 35, wherein said second demodulation circuit is a second RF mixer;
said second RF mixer receiving the amplified signal from said variable gain amplifier at an RF port and receiving the second modulation signal at a local oscillation port.

47. The frequency translation apparatus as claimed in claim 35, wherein said first modulation circuit is a second RF mixer;
said second RF mixer receiving the local oscillation signal at an RF port and receiving the first modulation signal at a local oscillation port;

said first demodulation circuit being a third RF mixer;

said third RF mixer receiving a mixed signal from said first RF mixer at an RF port and receiving the first modulation signal at a local oscillation port;

said second modulation circuit is a fourth RF mixer;

said fourth RF mixer receiving the filtered signal from said low pass filter at an RF port and receiving the second modulation signal at a local oscillation port;

said second demodulation circuit being a fifth RF mixer;

said fifth RF mixer receiving the amplified signal from said variable gain amplifier at an RF port and receiving the second modulation signal at a local oscillation port.

48. A direct conversion receiver apparatus, comprising:

a local oscillator to produce a first local oscillation signal and a second oscillation signal;

a first modulation circuit to modulate the first local oscillation signal;

a second modulation circuit to modulate the second local oscillation signal;

a first RF mixer to mix a received radio frequency signal with the modulated first local oscillation signal;

a second RF mixer to mix the received radio frequency signal with the modulated second local oscillation signal;

a first demodulating circuit, receiving a modulation signal and the mixed signal from said first RF mixer, to translate desired signals of the mixed signal from said first RF mixer into band and to translate undesired signals of the mixed signal from said first RF mixer out of band;

a second demodulating circuit, receiving a modulation signal and the mixed signal from said second RF mixer, to translate desired signals of the mixed signal from said second RF mixer into band and to translate undesired signals of the mixed signal from said second RF mixer out of band;

a first filter, operatively connected to said first demodulating circuit, to remove the undesired signals from the demodulated signal from said first demodulating circuit; and a second filter, operatively connected to said second demodulating circuit, to remove the undesired signals from the demodulated signal from said second demodulating circuit.

49. The direct conversion receiver apparatus as claimed in claim 48, wherein said first and second modulating circuits are RF mixers.

50. The direct conversion receiver apparatus as claimed in claim 48, wherein said first and second demodulating circuits are RF mixers.

51. The direct conversion receiver apparatus as claimed in claim 48, wherein the modulation signal is a square wave signal.

52. The direct conversion receiver apparatus as claimed in claim 48, wherein the modulation signal has frequency spectrum located adjacent to the desired signal.

53. The direct conversion receiver apparatus as claimed in claim 48, wherein the modulation signal is a single period square wave signal.

54. The direct conversion receiver apparatus as claimed in claim 48, wherein the modulating signal consists of multiple periods generated as the product of two or more periodic square waves.

55. The direct conversion receiver apparatus as claimed in claim 54, wherein the modulation signal is a pseudorandom binary sequence square wave.

56. The direct conversion receiver apparatus as claimed in claim 48, wherein the modulation signal is a sigma-delta modulator noise shaped sequence square wave.

57. A method for frequency translation in a direct conversion receiver, comprising:

(a) producing a local oscillation signal;

(b) modulating the local oscillation signal;

(c) modulating a received RF signal;

(d) mixing the modulated radio frequency signal with the modulated local oscillation signal; and (e) demodulating the mixed signal to translate desired signals of the mixed signal into band and to translate undesired signals of the mixed signal out of band.

58. A method for frequency translation in a direct conversion receiver, comprising:

(a) producing a local oscillation signal;

(b) modulating the local oscillation signal;

(c) mixing a received radio frequency signal with the modulated local oscillation signal;

(d) demodulating the mixed signal to translate a first set of signals of the mixed signal into baseband and to translate a second set of signals of the mixed signal out of baseband;

(e) filtering spurious responses;

(f) modulating the filtered signal;

(g) amplifying the modulated filtered signal; and (h) demodulating the amplified signal to translate a third set of signals of the mixed signal into baseband and to translate a fourth set of signals of the mixed signal out of baseband.

* * * * *